July 2, 1935.　　　V. H. SEVERY　　　2,006,413
ELECTRICALLY CONTROLLED PIANO
Filed May 1, 1933　　8 Sheets-Sheet 1
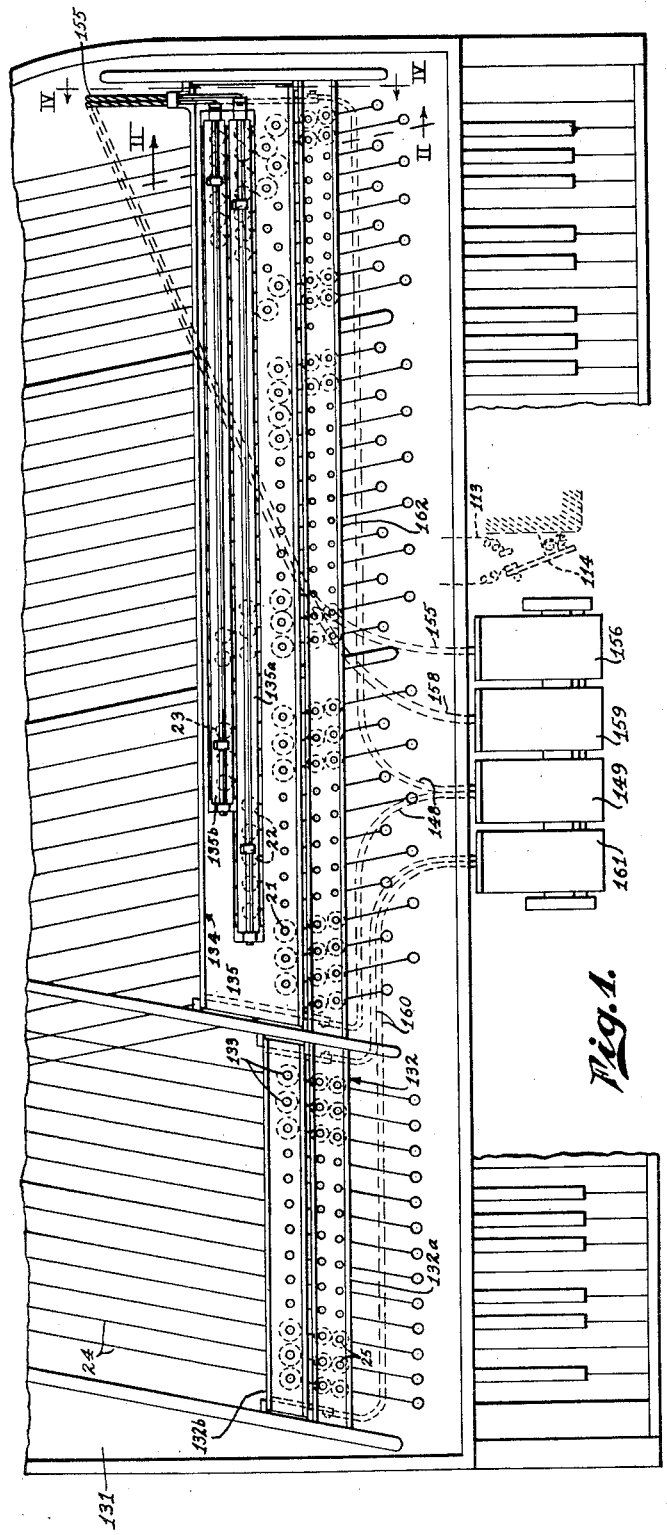
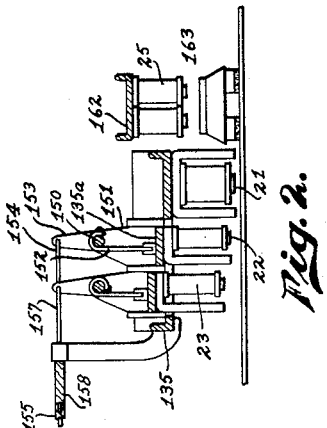
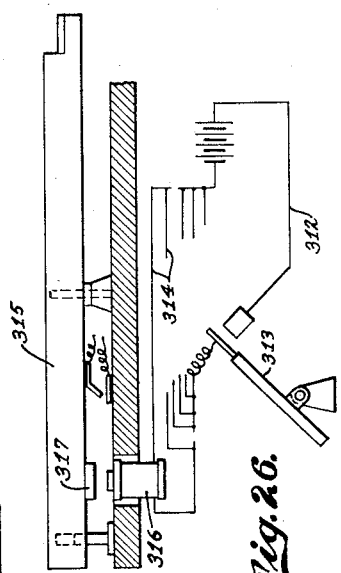
Inventor
Victor H. Severy
Lyon & Lyon
Attorneys

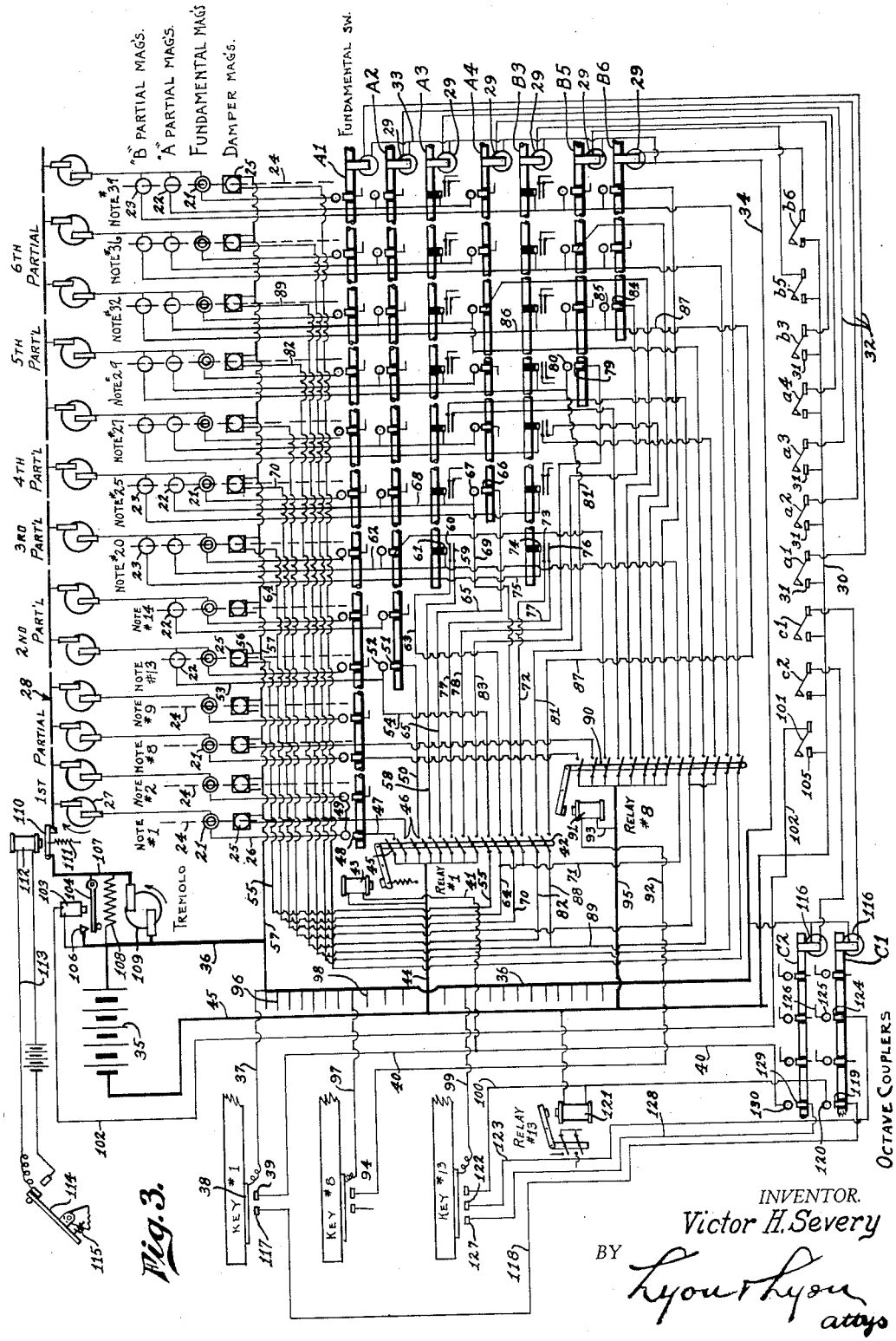

July 2, 1935. V. H. SEVERY 2,006,413
ELECTRICALLY CONTROLLED PIANO
Filed May 1, 1933 8 Sheets-Sheet 3
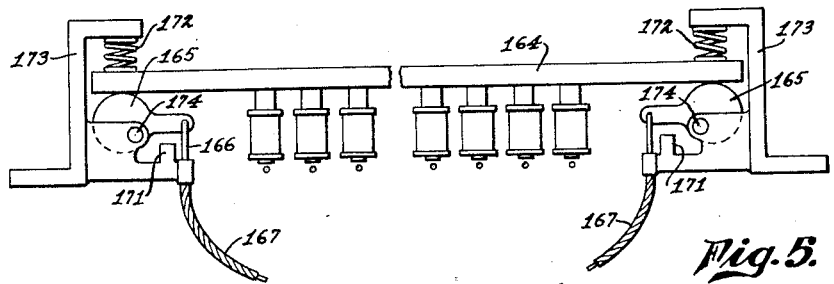
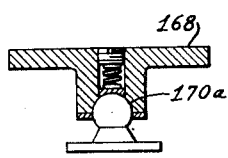
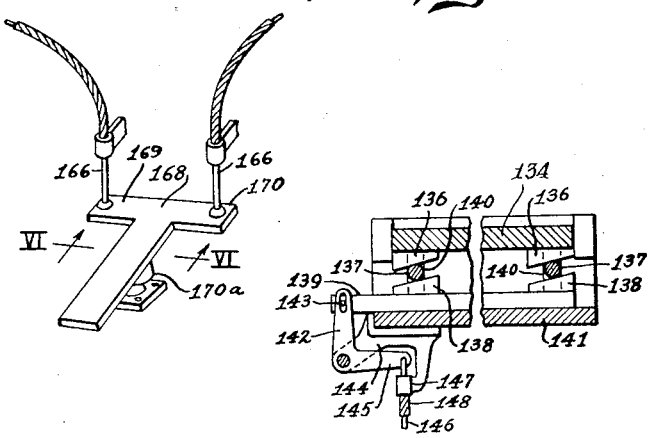
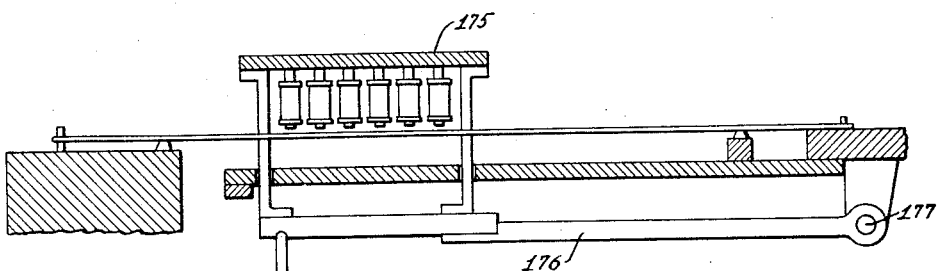
Inventor
Victor H. Severy
By Lyon & Lyon
Attorneys INVENTOR.
Victor H. Severy
BY
ATTORNEYS July 2, 1935.　　　　V. H. SEVERY　　　　2,006,413
ELECTRICALLY CONTROLLED PIANO
Filed May 1, 1933　　　8 Sheets-Sheet 5
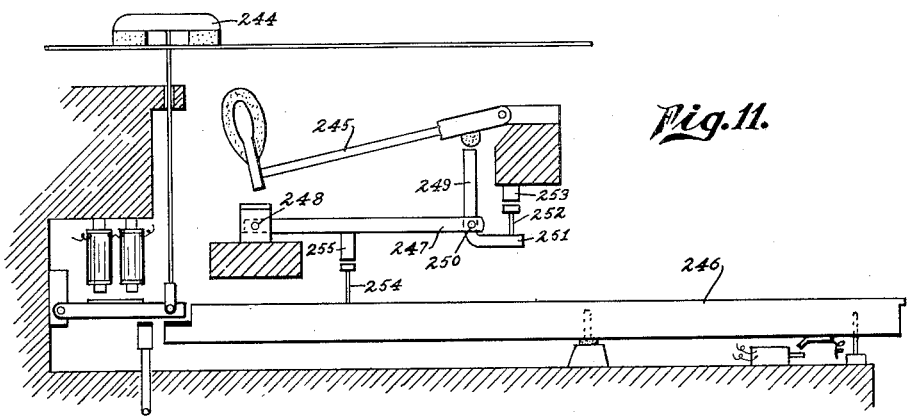
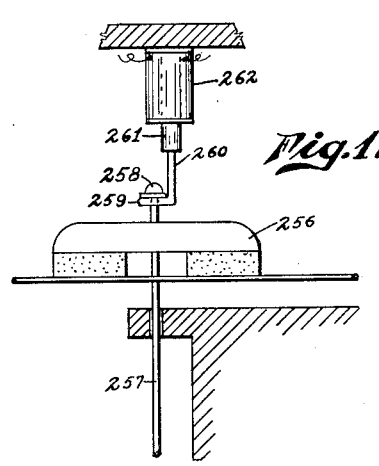
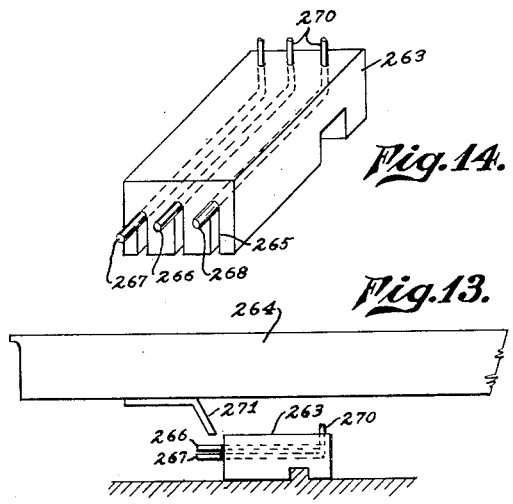
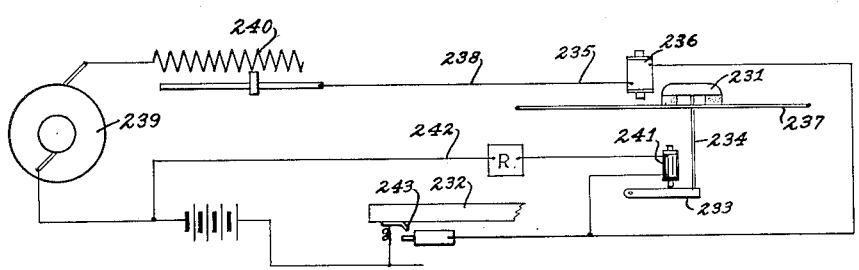
INVENTOR.
Victor H. Severy
BY
ATTORNEYS July 2, 1935.   V. H. SEVERY   2,006,413
ELECTRICALLY CONTROLLED PIANO
Filed May 1, 1933   8 Sheets-Sheet 7

INVENTOR.
Victor H. Severy
BY Lyon & Lyon
ATTORNEYS

Patented July 2, 1935

2,006,413

UNITED STATES PATENT OFFICE 2,006,413

ELECTRICALLY CONTROLLED PIANO

Victor H. Severy, Los Angeles, Calif., assignor, by mesne assignments, to Creative Industries, Inc., a corporation of Nevada Application May 1, 1933, Serial No. 668,735

23 Claims. (Cl. 84—1)

This invention relates to musical instruments, and while features of the invention may be applicable for instruments of different kinds, in the present specification the invention is described as applied to a stringed instrument such as a piano.

One of the objects of the invention is to provide apparatus in which the invention is embodied, and which can be employed as an attachment for a piano, being placed adjacent to the strings so as to provide for the operation of the strings either in conjunction with the ordinary means for vibrating the strings, or blending the same.

One of the objects of the invention is to provide simple means for enabling the relative volume of the tones produced by the strings to be controlled, for example, enabling the treble notes to be sounded with increased volume at will, or the notes that are located toward the base of the scale in playing the instrument.

A further object of the invention is to provide means for enabling partials to be produced on the instrument by the use of strings at a higher point on the scale than the string corresponding to a certain key when struck, and also to control the relative volume of such partials as compared with the fundamental note or first partial. This enables the timbre or quality of the musical tones produced by the instrument to be varied as desired, and enables the instrument to imitate the quality of different musical instruments.

A further object of the invention is to provide simple apparatus which may be incorporated in a piano, or attached to a piano for enabling the tones produced by the strings to be sustained as may be desired, so as to enable the piano to be played while giving the effects of an organ.

A further object of the invention is to provide simple means for enabling the volume of the tones from all of the strings to be readily controlled at will.

A further object of the invention is to provide means whereby the dampers of an instrument such as a piano, may be controlled in a dual manner, that is to say, by means of the ordinary mechanical damper controls, and also by electrical means brought into automatic operation upon the striking of the key.

In accordance with the invention, a wiring system is employed, enabling the strings to be vibrated without depending upon the hammer action of the instrument to vibrate the string producing the fundamental note, and one of the objects of the invention is to provide simple electrical means for vibrating other strings at a higher point on the scale to produce harmonic partials; also to provide means readily operable at will for inhibiting the operation of the electrical system to enable the instrument to be played when desired as an ordinary piano.

A further object of the invention is to provide electrical means for lifting the dampers from the strings, operating in such a way that the closing of the circuit that lifts the dampers will occur slightly before the closing of the circuit that effects the vibration of the string with which the damper cooperates.

In an embodiment of the invention referred to above, I employ a wiring system in which relay magnets are provided for controlling circuits, and one of the objects of the invention is to provide means whereby pulsating currents which I employ for vibrating the strings, may be used to close the relay switches, and if desired, also close circuits through the electromagnets that lift the dampers.

A further object of the invention is to improve the general construction of a piano capable of reproducing organ tones.

Further objects of the invention will appear hereinafter.

The invention consists in the novel parts and combination of parts to be described hereinafter, all of which contribute to produce an efficient electrically controlled piano.

A preferred embodiment of the invention is described in the following specification, while the broad scope of the invention is pointed out in the appended claims.

In the drawings:

Figure 1 is a plan of the forward end of a grand piano to which my invention has been applied, the rear of the piano being broken away together with a portion of the keyboard of the instrument, so as to facilitate the disclosure of the invention.

Figure 2 is a vertical section taken about on the line II—II of Figure 1, and further illustrating details of a magnet frame or rail which I employ for carrying electric means such as electromagnets for vibrating the strings.

Figure 3 is a diagrammatic view illustrating a portion of the wiring system and switches which I prefer to employ.

Figure 4 is a vertical section taken about on the line IV—IV of Figure 1, and further illustrating details of means which I employ for controlling the magnet rail to vary the volume of the tones produced on the instrument.

Figure 5 is a diagrammatic view illustrating another embodiment of means which may be employed for controlling the magnet rail to vary the volume of the tones produced on the string.

Figure 6 is a vertical section taken about on the line VI—VI of Figure 5, and further illustrating details of a universal pedal which I prefer to employ in the embodiment illustrated in Figure 5.

Figure 7 is a diagrammatic view showing a magnet rail in section, and illustrating another embodiment of the means for controlling the position of the magnet rail to vary the volume of the tones produced.

Figure 11 is a vertical section illustrating a key and mechanical hammer action of the common type, and particularly illustrating a contact device which I may employ to effect quick closing of the electric circuit through the electric control for the damper, that is to say, enabling the damper to be lifted promptly and before the circuit is closed through an electromagnet for vibrating the corresponding string.

Figure 12 is a vertical section through a magnet rail, and illustrating another embodiment of the dual control for the dampers.

Figure 13 is a detail view showing the outer end of a key, and further illustrating details of the contact device and its relation to the key for enabling a prompt operation of the damper.

Figure 14 is a perspective illustrating a contact block carrying contacts which will cooperate with the contact on the corresponding key to effect the early closing of the circuit through the damper magnets.

Figure 15 is a diagrammatic view illustrating a simple circuit with means for vibrating the string electrically, and for automatically raising the damper. This view also illustrates simple means for varying the volume of the tone produced by the string.

Figure 16:
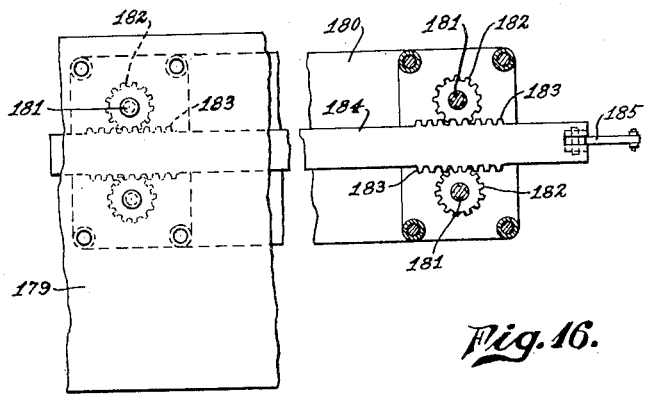

Figure 16 is a plan with certain parts broken away, and further illustrating means which may be employed for moving the magnet rail toward or away from the strings to vary the volume of the tones produced.

Figure 17:
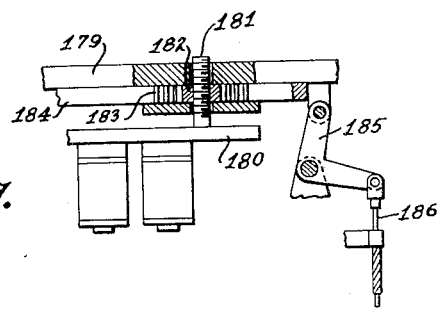

Figure 17 is an elevation in partial section taken at the end of the magnet rail, and further illustrating details shown in Figure 16.

Figure 18:
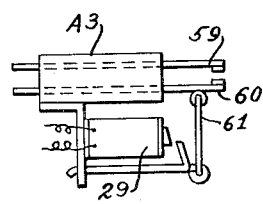

Figure 18 is a detail of a switch which I prefer to employ for closing circuits in the instrument.

Figure 19:
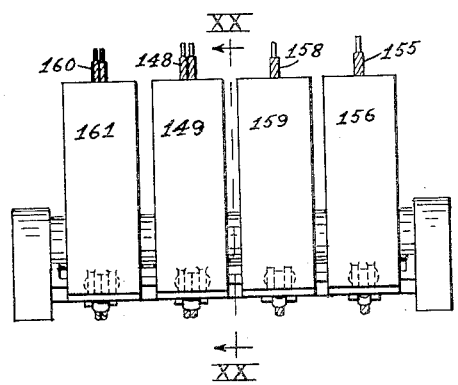

Figure 19 is a front elevation showing the pedals with means actuated by them for controlling the instrument.

Figure 20:
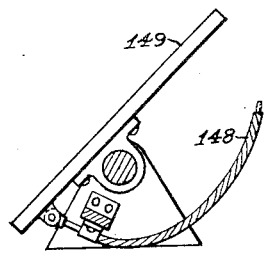

Figure 20 is a vertical section taken about on the line XX—XX of Figure 19, and further illustrating the details of the pedal mounting, and its connection to the control means which the pedal actuates.

Figure 21:
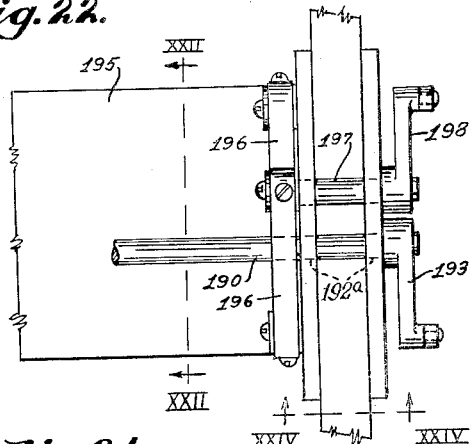

Figure 21 is a plan of one end of a magnet rail, with parts illustrated broken away. This view illustrates another embodiment of means for controlling the position of the rail at will.

Figure 22:
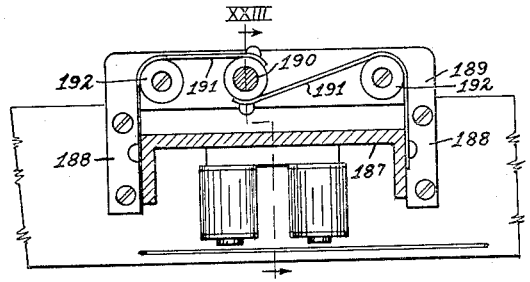

Figure 22 is a vertical section taken on the line XXII—XXII of Figure 21, but illustrating the details of the mounting for this rail at its other end.

Figure 23:
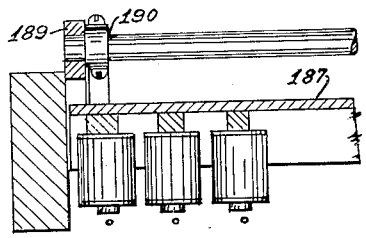

Figure 23 is a vertical section taken on the line XXIII—XXIII of Figure 22, with certain parts broken away and further illustrating the details shown in Figure 22.

Figure 24:
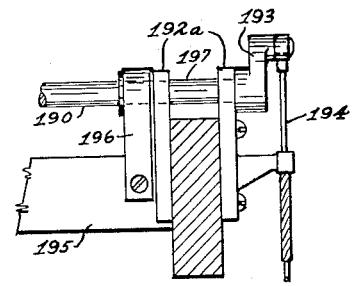

Figure 24 is a section taken about on the line XXIV—XXIV of Figure 21, and further illustrating details at this end of the rail.

Figure 25:
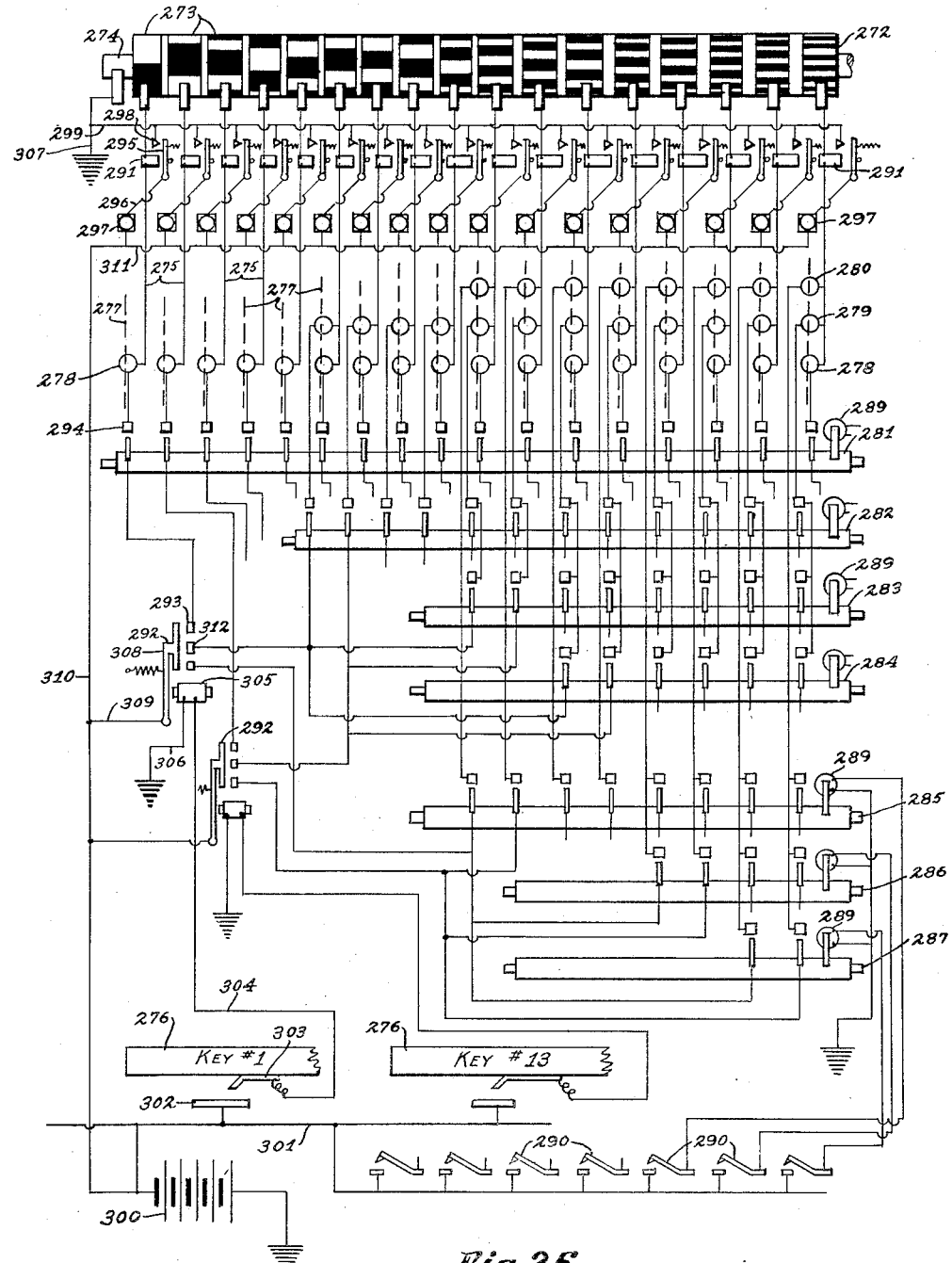

Figure 25 is a diagrammatic view illustrating another embodiment for the wiring of the damper magnets.

Figure 26 is a detail view illustrating means I may employ for sustaining a tone sounded by the depression of a key.

Before proceeding to a detailed description of the invention, it should be stated that in the present specification I have described the invention as applied to a piano. While the invention may be applied to an upright piano, I prefer to employ it in connection with a grand piano, because in that case I place the electromagnetic means for vibrating the strings above them, and this produces a more balanced vibration of the strings. The apparatus may be built into a piano, or may be constructed as an attachment or unit to be mounted in the piano over the strings.

In accordance with the invention, I prefer to provide a small frame which I call a magnet rail, and this frame is supported over the strings and provided with means in line with the strings for vibrating them individually, said means being electrically actuated.

The magnet rail for the bass strings carries magnets or other electrical means for vibrating the bass strings, the magnet rail corresponding to the treble strings extending a considerable distance over the bass strings or the strings located toward the "bass" end of the keyboard; and this magnet rail is preferably constructed as a compound rail, that is to say, it includes a body which carries electromagnets or other means for vibrating these strings to produce the fundamental tone of the string, and any partial tones which the string itself may produce by its vibration; the compound rail also includes two or more rails, which carry electromagnets or other means for vibrating the strings located toward the higher notes of the scale, and these magnets are employed for vibrating these strings to produce partials corresponding to notes sounded by keys located further down or toward the bass end of the scale. Means are provided for raising or lowering the entire compound rail bodily, so as to vary the volume of the sound developed by the vibration of the strings. Such variations will occur because the electromagnets employed for vibrating the strings, will be moved further away or nearer the strings which they vibrate. Means are also provided for independently raising or lowering the magnet rails of the "partial" magnets. This enables harmonic partials of any given note to be produced, and enables the volume of the partials to be varied with relation to the volume of tone produced by the striking of any key corresponding to a lower note of the scale.

If the magnet rail referred to above, is applied to an ordinary piano, when any key is struck, the hammer mounted in the piano will strike its corresponding string and produce the note corresponding to that key. At the same time, a circuit will be closed, which energizes the magnet located over the string, and in this circuit a pulsating current is developed having a regular frequency corresponding to the period of vibration of the string. This will energize and deenergize the electromagnet with a frequency corresponding to the period of the string, and maintain the string in vibration as long as the circuit is maintained closed. I also prefer to provide electrical means for holding down any note struck to attain a sostenuto effect; in other words to sustain a note.

In the wiring system, I prefer to provide a relay switch corresponding to the lower notes of the scale, that is to say, any note which is low enough on the scale to have partials capable of being sounded by strings of the treble, and in addition to this, I provide a plurality of selective switches which can be closed at will, for setting up circuits through the "fundamental" magnets and the different "partial" magnets. These selective switches are controlled by suitable means such as tappets within easy reach of the musician. Having set up certain circuits by means of these tappets, when a certain key is struck, the fundamental corresponding to its string, will be produced either through the operation of a "fundamental" magnet alone, or by supplementing the vibrations of the string due to its hammer, by the fundamental magnet; and in addition to this, circuits are closed through "partial" magnets which will vibrate strings corresponding to higher notes on the scale, thereby producing harmonic partials, the tones of which blend with those produced by the string corresponding to the key struck. By lowering the rails carrying the "partial" magnets the volume of these harmonic partials can be made to predominate at will. By determining the relative volume of these partials, the timbre of the tone produced by the instrument due to the striking of any key, may be controlled and given beautiful harmonic effects, and enabling the quality of different musical instruments to be imitated.

The wiring system is preferably controlled through the medium of a master switch which may be opened at will by the musician, so as to inhibit the operation of the magnets and enable the piano to be played whenever desired, as an ordinary piano.

When a circuit is closed through a "partial" magnet to vibrate the corresponding string, the damper corresponding to that string, is automatically lifted. In order to accomplish this, the regular mechanical lifting means for the dampers usually actuated by the piano keys, is supplemented by electromagnets.

Figure 8:
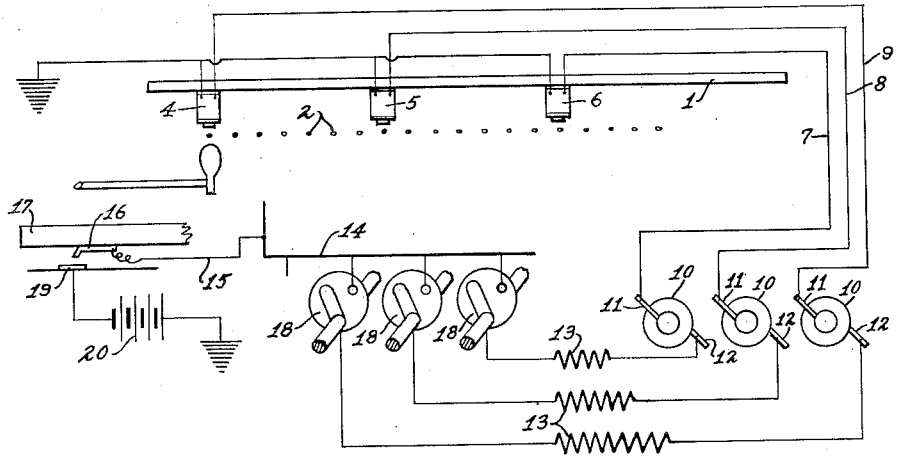
Figure 8 is a diagrammatic view illustrating a simple wiring arrangement which may be embodied in the instrument for producing partials of a note simultaneously with the fundamental tone of the note, and for controlling the volume of the partials.

In Figure 8 I illustrate a simple circuit arrangement with means for producing harmonic tones corresponding to a lower note, and for controlling the relative volume of the fundamental note and the other partials produced by simultaneously vibrating strings corresponding to the higher notes on the scale. In this view, I indicates a magnet rail extending across a bank of strings 2. For the purpose of illustration, this rail is indicated as provided with three electromagnets 4, 5 and 6. The coils of these electromagnets are wired in parallel on branch circuits 7, 8 and 9 respectively and in these branch circuits electrical interrupters 10 are provided, which, as indicated, may be of rotary type and provided with make-and-break discs composed of conductive strips and insulating strips alternately, and cooperating with branches 11 and 12 for breaking up the electric current into pulsating currents. The speed of rotation of these interrupters is such that the pulsations produced in any branch, will correspond to the period of the string adjacent to which the magnet in that circuit is located. Each branch circuit also includes a resistance 13. By varying these resistances, the volume of the sound produced by the strings corresponding to the different magnets, may be controlled as desired. The wiring includes a trunk line 14 into which branch wires 15 connect, each of these wires being connected to a contact 16 of the corresponding key 17. Gang switches 18 are provided in the branch circuits 7, 8 and 9, for setting up the circuits. When the key 17 is depressed, the contact 16 carried by it engages a fixed contact 19 connected with a source of current such as a battery 20, thereby closing the circuit through the magnet 4, and other "partial" magnets such as the magnets 5 and 6, depending upon which of the switches 18 are closed.

As illustrated in Figure 8, the resistances 13 that correspond to the magnets are such as to give a relatively increased volume to the partial tones.

In Figure 3, I illustrate the essential features of a wiring system such as I prefer to employ, and which corresponds to the magnet rail illustrated in connection with the right-hand set of strings as in Figure 1. In this view, 21 indicates the fundamental magnets, and 22 and 23 indicate the partial magnets. The magnets 22 are indicated by a legend on the drawings as "A" partial magnets, that is to say, these magnets 22 are all carried on the same "partial" rail. The magnets 23 correspond to the second "partial" rail. These magnets are mounted in rows extending across the strings 24 indicated by the vertical dotted lines.

Adjacent the fundamental magnets 21, I provide damper magnets 25, the function of which is to raise the dampers corresponding to their strings.

A fundamental switch A1 is provided, the function of which is to set up circuits through conductors 26 that correspond to the different notes indicated by legends on this figure, thereby enabling a circuit to be closed through the fundamental magnets 21 and through corresponding circuit interrupters 27 which are connected on their other sides to a trunk line 28. These interrupters may be rotary interrupters as indicated, and operate to make and break the circuit through the fundamental magnet with a frequency corresponding to the period of the corresponding string or note. Some of the notes from 1 to 9 inclusive, are indicated in the figure, and these notes correspond to fundamentals or first partials.

The partial magnets 22 may begin at any suitable point, for example, at note 13, extending out to the treble end of the scale. The fundamental magnets also extend to the treble end of the scale. Corresponding to the "A" partial magnets, I provide a second partial switch indicated by A2, and when this switch is closed, it will set up circuits which can be closed through the partial magnets 22.

A 3rd partial switch A3 is provided, which is for setting up circuits through partial magnets which can vibrate strings to produce 3rd partials corresponding to a lower key on the scale.

I also provide a similar switch A4, which can be closed at will to set up circuits through the partial magnets when using them to produce 4th partials corresponding to the lower keys of the scale. The fundamental switch A1 and the switches A2, A3, and A4, may be considered to constitute a set of switches which are employed for setting up circuits in the "A" partial magnets. Indicated below these switches for the "A" partials, I provide three switches, B3, B5, and B6. These switches are likewise capable of being closed at will by the musician, for setting up circuits which may be closed by the keys through the "B" partial magnets 23. More particularly, the switch B3 will set up circuits for producing 3rd partials, while the switch B5 will set up circuits for sounding 5th partials, and the switch B6 will set up circuits for producing 6th partials of lower notes of the scale.

Any suitable means may be employed for operating the fundamental and partial switches just described. In the present instance, this may be accomplished by employing corresponding tappet switches a1, a2, a3, a4, b3, b5, and b6. The closing of any tappet, for example, the tappet a3, will close the circuit through an electromagnet 29. These electromagnets 29 correspond to these switches, and when any electromagnet is energized, it will rotate the shaft of this switch and close contacts connected up to the corresponding fundamental magnets or partial magnets. The wiring for this purpose, includes a trunk line 30 carrying fixed contacts 31 which cooperate with the tappets a1, a2, etc. The tappets are connected by conductors 32 respectively, with the corresponding electromagnets 29, the other ends of the coils being attached to a common return wire 33 that extends along past the magnets and connects to a conductor 34. These magnet circuits are supplied with current from the battery 35 by circuit wires that will be described hereinafter, in connection with the other circuits.

The battery 35 supplies current to a trunk conductor 36 from which the different keys of the piano are wired. For example, three keys are illustrated: Key #1, key #8, and key #13 of the keyboard. Key #1 is connected by a branch wire 37 with the main conductor 36, and when this key is depressed, a contact 38 on it engages a fixed contact 39, thereby supplying current to a conductor 40 that supplies current to a branch wire 41 leading over to relay #1 that corresponds to this key, thereby energizing the coil 43 of its multiple switch 42 which is connected to conductor 44, this conductor 44 leading to a main conductor 45 that is connected to the other side of the battery 35. Multiple switch 42 carries a plurality of movable contacts 45 for engaging with corresponding contacts 46 to set up circuits through the different fundamental and partial switches, and when this multiple switch is closed, it also closes the circuit through the damper magnet corresponding to any magnet through which the circuit is set up. For example, assuming that the fundamental switch A1 has been closed to set up circuits through all the fundamental magnets, when multiple switch 42 is closed, the circuit will be closed through wire 47, movable contact 48, fixed contact 49, and conductor 26, through the fundamental magnet 21 corresponding to note #1. When key #1 is depressed, the closing of the relay establishes this circuit through the fundamental switch, which has already been closed to set up the fundamental circuits. The fundamental magnet 21 will then be energized with a pulsating current by the interrupter 27 to vibrate string 24 corresponding to note #1.

If the second partial switch A2 has also been closed to set up circuits through the "A" partial magnets, the closing of the multiple switch 42 will also close the circuit through wire 50 leading to movable contact 51, which will then be in engagement with contact 52, thereby supplying current to wire 53 which carries current to the electromagnet 22 corresponding to note #13. Hence, the partial magnet for note #13 will be energized and vibrate its string and produce the first partial corresponding to note #1. When current is supplied to the fixed contact 52, current passes by wire 54 through the multiple switch 42 to wire 55, and this wire runs up and connects to the damper magnet 25 that corresponds to note #13, the other side of this magnet having a wire 56 connected to it that leads to a return wire 57 that connects to the main line 36.

If the 3rd partial switch A3 has also been closed, then when the multiple switch 42 becomes closed, current will be supplied over wire 58 to contact 59, which will be in engagement with contact 60 and contact 61. This will supply current to the contact 61, which is connected to wire 62 that leads up to the partial magnet 22 of note #20, which will be sounded to produce the 3rd partial for note #1. Current from contact 60 will flow through wire 63 through the multiple switch 42 to wire 64, which wire is connected to the damper magnet corresponding to note #20. In connection with the 3rd partial switch A3, it should be stated that the contacts controlled by this switch, may be two relatively movable contacts such as illustrated in Figure 18, which are moved against each other by the insulated contact 61 of the switch A3 when this switch is closed. All of the contacts corresponding to this switch A3 operate in this way. If the 4th partial switch A4 has been already closed before the key #1 is depressed, a circuit will be established through wire 65 that connects to the insulated contact 66 on this switch, which will then be in engagement with contact 67 which is connected by wire 68 with the partial magnet 22 corresponding to note #25. The damper magnet will be energized by current leading through branch wire 69 that leads the current through multiple switch 42 and over wire 70 that connects to this magnet.

If the 3rd partial switch B3 has been closed, circuits will be set for sounding 3rd partials of the note corresponding to the key struck. The current to pass through the switch B3 is supplied by current which flows through the switch A3. If both of these switches A3 and B3 have been closed, current will flow down wire 71 from wire 64, and be carried along wire 72 to contact 73 from which point current will flow through contact 74 and thence upwardly on wire 75 to "B" partial magnet 23, that is over the string corresponding to note #20. Current will also flow from contact 76 which is touching contact 73 at this time, and passes by wire 77 over through multiple switch 42, and thence to wire 44. Wire 64 has already been described, and connects with the damper magnet 25 corresponding to the string of note #20.

If the switch B5 is closed, it will set up a circuit connecting to the "B" partial magnet 23 for the string of note #29. This circuit is closed through wire 78 in the multiple switch 42, and this wire leads over and connects to contact 79 carried by this switch, and this contact will then be in engagement with contact 80 from which the circuit is closed over wire 81 that extends back to the multiple switch and through the multiple switch, and thence over wire 82 up to the damper magnet 25 corresponding to the string of note #29.

If the switch B6 is closed, it will set up the circuit for the 6th partial by connecting up the "B" partial magnet corresponding to the string of note #32. In this case the circuit is closed from the multiple switch 42 by wire 83 which leads from the multiple switch over to the contact 84 on the switch B6, which will then be in engagement with contact 85 which is connected to wire 86 that extends up to the "B" partial magnet 23 over the string corresponding to note #32. Below the contact 85 a connecting wire 87 leads over to the multiple switch, and from the switch by wire 88 over to wire 89 which passes up to the damper magnet 25 corresponding to this string.

Wiring similar to that described above, is provided, through which circuits may be established through relay #8 which controls another multiple switch 90 which is similar to the multiple switch 42 and wired in the same way. An electromagnet 91 for this relay #8 will be energized by the depression of key #8 through wire 92 and wire 93, the former of which comes from the key contact 94 under key #8, and the latter of which connects to wire 95 that connects up with the main wire 45. This wire 95 corresponds to wire 44 described in connection with multiple switch 42.

It should be understood that for all the lower keys of the scale, wiring as described above, is provided for establishing circuits through different individuals of the group of "A" partial magnets and "B" partial magnets. Hence, the wiring should include seven wires such as the wires 96 which lead off from the wire 36 between the wire 37 that supplies current to the key #1, and wire 97 that supplies current to key #8. Likewise, there are three wires 98 that lead off from wire 36 between wire 97, and a wire 99 that leads over to key #13. When key #13 is depressed, it closes a circuit through wire 100 to relay #13, which operates a multiple switch similar to the multiple switches 42 and 90 already described.

Connected with the wire 30 which has been described in connection with the tappets a1, a2, etc., I provide a tappet 101 which is connected to a wire 102 that connects with an electromagnet 103 to control a switch 104, the other end of the coil of magnet 103 being connected to wire 36. When this tappet 101 engages its fixed contact 105, the magnet 103 will be energized and pull up the switch 104 against contact 106, and this contact is connected with wire 36. The switch lever 104 is connected to a main wire 107 that is an extension from the main wire 28 already described.

Between the wires 107 and 36 a resistance 108 may be provided, and beyond this resistance a tremolo device 109 may be wired in between these wires 107 and 36. This tremolo device is preferably a rotary device constructed so that when standing still, it will not affect the current in the wire 28, but if it is rotated, a tremolo effect will be produced.

The switch 104 may be considered as the main switch which must be closed in order to connect the interrupters 27 into circuit so that upon setting up circuits by the fundamental and partial switches A1, A2, etc., B3, etc., circuits can be established by the depression of the different keys of the instrument, by closing of their corresponding relay switches. I prefer to provide another switch 110 which may be connected in between the wires 28 and 107. This switch is normally held closed by a spring 111, but can be opened at will by closing a circuit through an electromagnet 112, said circuit indicated by the number 113, being controlled by a switch 114 mounted in a knee-swell which is mounted on the piano adjacent the player's knee. This knee-swell switch 114 is normally held open by a spring 115.

If desired, I may provide coupler switches C1 and C2, which are connected up into the wiring so that when closed they will set up circuits by means of which octaves of the note struck will be sounded simultaneously with the note. The coupler switch C1 will sound the higher octaves, while the coupler switch C2 will sound the lower octaves. These coupler switches are controlled respectively, by electromagnets 116 which are controlled by corresponding tappets c1 and c2. If the coupler switch C1 has been closed when key #1 is depressed, current will flow to it from a key contact 117 under key #1, said current passing down wire 118 which connects to contact 119 on the coupler C1. This contact will then be in engagement with contact 120 connected to wire 100. This will energize the electromagnet 121 that corresponds to relay #13, and this will close the multiple switch corresponding to relay #13 and establish the circuit to vibrate the string of key #13, as though key #13 had been struck.

Assuming that the coupler switch C2 has been closed, if key #13 is depressed, current will flow down from contact 122 through wire 123 to contact 124, and thence through contact 125 and wire 126 to relay #25 (not illustrated). This will close the multiple switch corresponding to relay #25, and sound note #25 as though its key had been depressed. When key #13 is depressed, it will also supply current to contact 127, enabling current to flow down wire 128 to contact 129 on coupler C2, which contact will then be in engagement with contact 130, thereby passing current to wire 40 which will energize electromagnet 43 of relay #1. This will close multiple switch 42 corresponding to relay #1, and sound the note #1 as though key #1 had been struck.

Referring now to Figure 1, 131 indicates the case or body of the instrument on which the strings are mounted. Over the bass strings I provide a magnet rail 132 which may be made in two sections, 132a and 132b. If desired, the section 132b may be mounted so as to enable it to be elevated or depressed at will. The rail 132b carries electromagnets 133 for vibrating the strings. The rail 132a is a damper rail and carries damper magnets 25.

For the strings corresponding to note #14, and the remainder of the strings up to the end of the treble, I provide a magnet rail 134 which is in the form of a small frame supported over the strings of the instrument. This rail is preferably a compound rail including a main rail 135 which carries the "fundamental" magnets 21, and on this main rail 135 I support a rail 135a for carrying the "A" partial magnets 22 already referred to, and in a similar manner I support a rail 135b which carries the "B" partial magnets 23. The compound rail 134 is supported in such a way that it can be moved at will, nearer to or further from the strings. In order to accomplish this, I provide the ends of this rail on its under side, with wedge blocks 136 (see Fig. 4) under which rollers 137 are provided, and these rollers are supported on corresponding wedge blocks 138 which are secured to a slide bar 139. The ends of the rollers are mounted in vertical guides 140. The slide bar 139 is supported on a base plate or board 141 that is fixed in the piano, and suitable means is provided for moving this slide bar 139 in or out at will. For this purpose I may provide a bellcrank lever 142, the upper arm of which has a pin-and-slot connection 143, with the end of the slide bar. This bellcrank lever is pivotally mounted on a suitable bracket 144 and has a substantially horizontal arm 145 to which a flexible wire 146 is attached, said wire being guided in a guide 147 on the bracket, and being housed in a flexible casing or tube 148. These wires extend down to a treble pedal 149 (see Fig. 1) which is in a position to be actuated by a foot of the player. The detail for the connection of these actuating wires is shown in Figures 19 and 20. The magnet rail 135a (see Fig. 2) can be raised or lowered on the main rail 135, at will, by the player. For this purpose this rail is supported on a rock shaft 150 which is mounted in bearings on a bracket 151 on the main rail, and this rock shaft is provided with straps 152 that support the rail 135a. The rock shaft is provided with an arm 153 that is connected to a flexible wire 154. This wire is carried in a flexible tube 155 (see Fig. 1) which leads down to a pedal 156 which is similar to the pedal 149 and mounted the same way. This wire connects to this pedal as indicated in Figures 19 and 20

The partial rail 135b is mounted in the same manner as the rail 135a, and is controlled by a flexible wire 157 that passes down through a flexible tube 158 to a pedal 159 similar to the pedal 156. The magnet rail 132b for the bass strings, is also mounted for up and down adjustment, and this is preferably by means such as that illustrated in Figure 4, that is to say, its details are the same as those employed for accomplishing this function for the main rail 135. In order to raise and lower the magnet rail 132b, I provide wires similar to the wires 146 which are guided in flexible tubes 160. These flexible guide tubes 160 pass down and are attached to a pedal 161 for controlling the bass notes.

The rail 132a is a magnet rail for carrying damper magnets 25, and in line with this rail 132a, I provide a damper rail 162 which carries damper magnets 25. The damper magnet rails are held fixed in position and are provided on their under sides with the electromagnets 25, which, when energized, will pull up their corresponding dampers 163 (see Fig. 2).

The wedge device illustrated in Figure 4, is illustrated merely as an example of means I may employ for raising and lowering the magnet rails that carry the magnets that vibrate the strings. Any suitable mechanism that would accomplish this purpose, and enable the ends of each rail to be raised or lowered independently of the other end, could be employed. For example, in Figure 5 I illustrate another means for this purpose, in which the magnet rail 164 is supported on two cams 165, said cams being connected to operating wires 166 that extend down through guide tubes 167 to a dual pedal 168. This pedal is of T-form with one arm 169 attached to the left-hand wire 166, and a right arm attached to the right-hand wire 166. This pedal is mounted for rocking laterally, or in a longitudinal direction by the player's foot placed upon it. For this purpose I prefer to mount it on a universal joint 170a which may have the construction illustrated in Figure 6. With this construction it will be evident that by rocking the pedal 168 in a front and rear plane, both ends of the magnet rail 164 can be raised or depressed simultaneously, but if the right arm 170 is depressed, the right end of the magnet rail 164 will be raised, and vice versa. Stops 171 may be provided to cooperate with the cams to limit their movement in a downward direction. The ends of the magnet rail 164 may be pressed down against the cams by light coil springs 172 set under brackets 173, which support the cams on their pivots 174. If desired, a mounting for the magnet rail may be provided, which will merely permit of an up and down adjustment of the rail, without permitting the variation of the movement of one end of the rail as compared with the other. Such a construction is illustrated in Figure 7, in which the magnet rail 175 is supported on a swinging frame 176 pivotally supported at 177 and controlled by a pedal 178.

In Figures 16 and 17, I illustrate another embodiment of means for raising or lowering a magnet rail at both ends simultaneously. In other words, the amount of lift at each end is the same. In this embodiment 179 indicates a hanger bar which is mounted in a fixed position above the magnet rail 180, and the magnet rail is supported on fixed stems 181, which are formed with screw threads. These threaded stems pass upwardly through nuts 182 respectively, in the form of pinions, the teeth of which mesh with the teeth of two racks 183 formed on the edges of the slide bar 184. This slide bar may be actuated by a bellcrank lever 185 controlled by a flexible wire 186.

In Figures 21 to 24 inclusive, I illustrate another embodiment of means for raising and lowering the rails, and enabling the magnet rail corresponding to the bass notes to be raised and lowered by means actuated at the treble end of the piano. In these views, Figure 23 indicates the left end of the magnet rail 187 for the bass strings, said rail being guided at its ends between guide arms 188 that are extensions from a bracket plate 189, which forms a bearing for the adjacent end of a rock shaft 190. This rock shaft carries two straps 191 that pass over pulleys 192 attached on the bracket, and which are attached to the sides of the rail. With this arrangement, it will be evident that by slightly rotating the rock shaft 190 in either direction, the rail can be raised or lowered. By duplicating the straps 191 at two points over the bass rail, the rail can be raised and lowered at both ends. Figure 21 indicates the shaft 190 already referred to, and this shaft at the treble end of the piano is supported in bearings 192a, and its projecting end carries a rigidly attached lever 193 to which a flexible wire 194 may be attached. In Figure 21, 195 indicates a magnet rail for the treble strings, and this rail may be supported on two straps 196 similar to the straps 191 and attached to the ends of a rock shaft 197 mounted in the bearing plates 192a and provided with a rigid arm 198 to enable it to be actuated by a flexible wire similar to the wire 194. The rock shaft 197 and associated parts would be duplicated at the left end of the treble magnet rail, and an arm similar to the arm 198 would be provided, controlled by its own flexible wire. This would enable independent raising and lowering of the ends of the treble magnet rail, the corresponding flexible wires being attached to corresponding pedals as already described in connection with Figure 19 and Figure 4.

Figure 9:
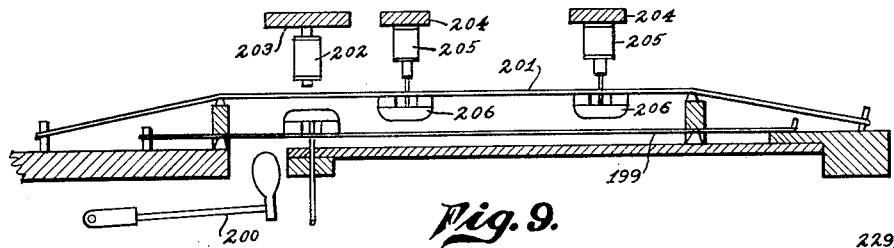
Figure 9 is a vertical section through the harp of a piano, and illustrating a construction in which a separate set of strings are employed for producing the partial tones by electrical means, and independently of the regular strings of the instrument.

In Figure 9, I illustrate an embodiment of the invention in which 199 indicates the regular piano wires which are struck by the hammers 200, corresponding to the different keys of the piano. This instrument would include a separate set of strings 201 located over the regular strings 199, and these strings would be vibrated by electromagnets 202 carried on the magnet rail 203. Damper rails 204 would be provided having electromagnets 205 for controlling dampers 206. In this embodiment of the invention, the electrical vibration of the strings would supplement the vibration of the strings by the hammers if desired, or if desired, the instrument could be played merely by closing circuits through the electromagnets.

Figure 10:
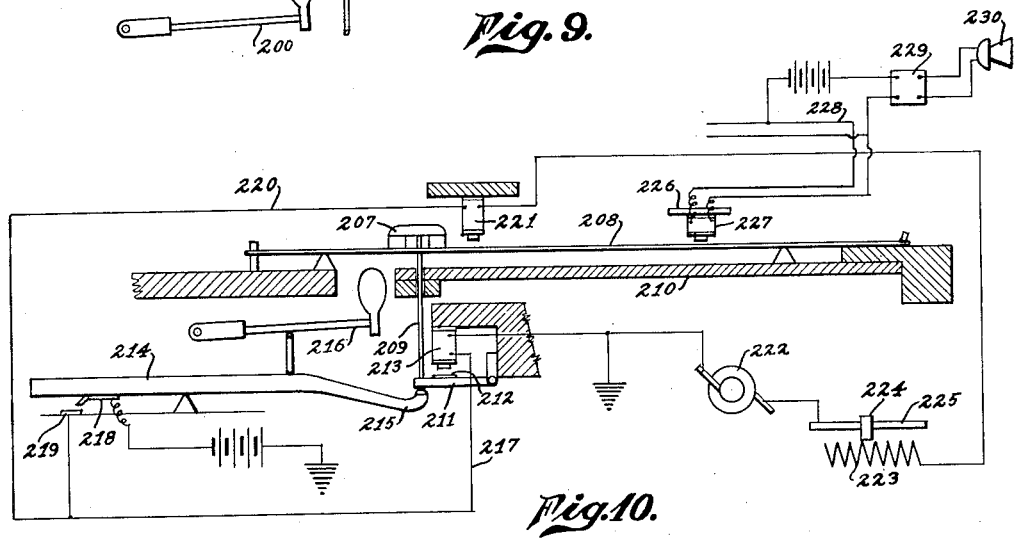
Figure 10 is a diagrammatic view illustrating means employed for enabling the dampers to be operated mechanically, and also electrically. This view also illustrates the use of means for using the vibration of the string to develop pulsations in a circuit connected with a loud speaker.

In Figure 10 I illustrate a dual control of the dampers of the instrument such as damper 207. Such damper would be disposed above the strings 208 and carried on a stem 209 guided down through the sounding-board 210 with its lower end resting on a lever 211. This lever is provided with an armature 212, which will be lifted when current is energizing an electromagnet 213 mounted above the lever. The piano keys such as key 214 are provided with extensions 215 respectively, that project under the lever 211, and when the hammer 216 is actuated by the key, the damper 207 will be raised. A circuit 217 through the electromagnet 213 would be closed by the key contacts 218 and 219 when the key is depressed, and at the same time, a circuit 220 would be closed through the electromagnet 221 to vibrate the string. The circuit 220 would include an interrupter 222, and should include a variable resistance 223 having a movable contact 224. This contact 224 may be mounted to slide on a fixed bar 225. By setting it at different points along the resistance coil 223, the energy of the magnet 221 can be regulated and in this way the volume of sound from the string can be controlled.

If it is desired to transmit music from the instrument to a distance, this may be accomplished by providing rails such as the rail 226 over the strings 208, each rail being provided with electromagnets such as the magnet 227 corresponding to the strings. The coil of this magnet would be connected into a circuit 228 leading to an amplifier 229, and thence to a loud speaker 230 which could be set up near a microphone for broadcasting.

Figure 15 is a diagrammatic view of the general nature of Figure 10, but illustrating the dampers such as damper 231 arranged to be lifted electrically and not mechanically, although it could readily be arranged for mechanical lifting by extending the rear end of the key 232 under the lever 233, which is connected by a stem 234 to the damper. In this view the circuit 235 through the coil of the electromagnet 236 for vibrating each string 237, is connected in a circuit 238 including an interrupter 239 corresponding to each string. A variable resistance 240 may be provided as indicated in Figure 10. The lifting magnet 241 for the damper 231 may be wired into a branch circuit 242, which is normally open at the key contacts 243. When the key is depressed, this circuit 242 would be closed simultaneously with the circuit through the electromagnet 236, thereby lifting the damper and sounding the string simultaneously.

In Figure 11 I illustrate another embodiment of dual means for actuating the dampers, such as damper 244, and in which the hammer 245 is actuated indirectly from the key 246 through the medium of a secondary lever 247, which is mounted at 248 on a fixed pivot, its free end being provided with a head 249 that is mounted on a pivot 250 on the free end of the lever 247. The head 249 has a lateral extension or foot 251 which carries a stem 252 with a head located under a fixed abutment 253. When the key 246 is depressed, a stem 254 upon it strikes an abutment 255 under the lever 247, and swings the lever upwardly. As the lever swings upwardly, the head on stem 252 strikes the abutment 253, and this gives the head 249 a sudden rotation on its pivot 250, giving the hammer 245 a sudden impetus.

The dual control for the damper 244 is, however, substantially similar to that illustrated in Figure 10.

In Figure 12 I illustrate the preferred embodiment of the connection of the electrical means for controlling the dampers such as damper 256. This damper is rigidly secured to a guide stem 257 that is actuated by the key. The stem 257 extends up above the damper and carries a head 258, under which extends a lateral foot 259 extending outwardly from the shank 260 of an armature or core 261 for the electromagnet 262. When the electromagnet 262 is energized, the core 261 will be pulled up, thereby raising the damper.

In order to give the damper magnets a lead on the electromagnets that vibrate the strings, I prefer to employ a contact device such as illustrated in Figures 13 and 14. This contact device consists of a block 263 corresponding to each key 264. The block is held in a fixed position under the key as illustrated in Figure 13, and is provided on its under side with a plurality of longitudinal grooves 265. In these grooves, light spring contacts 266, 267, and 268 are mounted, the other ends of these contacts being bent upwardly as indicated at 270 to facilitate the attachment of wires to them. The slot 265 that corresponds to the contact 266, permits the contact 266 to be held at a higher elevation than the other contacts, so that when the key contact 271 comes down with the key, it will engage the contact 266 first. This contact will be connected to the damper circuit for this key. These contacts 267 will move downwardly very freely, so that they will offer no appreciable resistance to the pressure of the key. The contact 267 can be employed to close the circuit through the relay switch corresponding to this key, and the other contact 268 can be employed to close a circuit set up through one of the coupler switches C1 or C2.

In Figure 25 I illustrate a wiring system for use in an instrument of this kind, in which the circuit through each damper corresponding to a key, is established by means of a relay magnet connected directly into the circuit in which the interrupter is located. This view is diagrammatic, and indicates a set-up for operating only seventeen strings. In this view 272 indicates a multiple interrupter having a plurality of interrupter discs 273 on a common shaft 274, and this shaft would be rotated at a proper speed to cause impulses in the different circuits 275 corresponding to the different piano keys 276. Over the strings 277 a row of "fundamental" magnets 278 is provided, and a row of "A" partial magnets 279, and a row of "B" partial magnets 280. The circuits through the wires 275 may be set up by means of the "fundamental" switch 281 and "partial" switches 282, 283 and 284 in one set. A second set of partial switches is provided, including switches 285, 286 and 287. The fundamental switch and the other partial switches may be closed to set up harmonic circuits by means of electromagnets 289 controlled by tappets 290. In this figure the wiring to the upper magnets 289 is omitted, but the wiring to the tappets for the switches 285, 286 and 287 is indicated.

In each of the circuits 275 an electromagnet 291 is connected. When any particular key 276, for example, key #1 is depressed, the circuit will be closed through a corresponding relay switch 292 closing the circuit from contact 293, and through the fundamental switch 281 through its contact 294 connecting to wire 275. This will energize the magnet 291 by means of impulses from its correspoding interrupter 273. This magnet 291 will then close a small relay switch 295, which is connected by wire 296 to its corresponding damper magnet 297. In other words, the magnet 291 will pull the movable switch member over against a fixed contact 298, and this will close the circuit through the damper magnet 297 by way of a conductor 299 common to all of these relay switches. These relay switches 295 are normally held open by springs as indicated. The circuit closed by key #1 would be from the battery 300 over main wire 301 to contact 302, and thence to the key contact 303 to wire 304, and thence through the coil 305 of the relay switch 292, and from this point through wire 306 to the ground. The other side of the battery is connected to the ground also. The energizing of this coil 305 would close this switch 292, and this would close the circuit through the wire 275 for this key, the circuit being grounded at 307. The movable contact 308 for the relay switch 292 is connected by a wire 309 to a main wire 310 that leads up to a cross wire 311 to which all the damper magnets 297 are connected. The switch 292 and all other relay switches controlled by the keys, would be provided with contacts 312 leading over to the different partial switches so as to close harmonic circuits through magnets that would vibrate strings higher up on the scale, as described in connection with Figure 3.

Referring again to Figure 10, it should be stated that one of the advantages of employing the pickup device at 227, is that the pulsations produced in the circuit 228 will follow a sign curve form, which well adapts them for actuating a transmitter such as the transmitter 230.

In Figure 26 I illustrate means for obtaining a sostenuto effect on any tones that are sounded by the depression of a key. In order to accomplish this I provide a circuit 312 closed at will by a pedal switch 313 and having branches 314 in which keys such as key 315, are connected. Under each key an electromagnet 316 is connected into its corresponding branch wire 314. If the pedal switch is closed after depressing a key, the magnet 316 will hold the key down by coacting with an armature 317 under the key. The magnets 316 are too weak to pull down the keys, but will hold the key down after it has been depressed. This will sustain the tones produced by the key until the pedal switch is reopened.

It should be noted that when switch 110 is open, and the piano is being played to vibrate the strings through the hammer actions, the circuits through the damper magnets will be closed when any key is struck. If any of the partial switches are held closed at such a time, the dampers corresponding to these partials will be held off their strings. This will permit these strings to vibrate in harmonic consonance with the string struck by the key, thereby producing beautiful overtones.

It is understood that the embodiment of the invention described herein, is only one of the many embodiments this invention may take, and I do not wish to be limited in the practice of the invention, nor in the claims, to the particular embodiment set forth.

What I claim is:

1. In an electrically operated musical instrument having a plurality of tone producing vibrators to vibrate at different periods of vibration corresponding to the notes of a scale, the combination of a keyboard having a plurality of keys corresponding to the different vibrators, an electric circuit corresponding to each key including contacts, closed by the depression of the key, electrical means in each of said circuits for subjecting each vibrator to a succession of impulses of a frequency to start the vibration of the corresponding vibrator, and thereby sound its tone in the atmosphere at the vibrator, branch circuits with electrical means therein for vibrating the vibrators corresponding to the higher notes of the scale and thereby produce directly in the atmosphere higher partials corresponding to the fundamental tone from each of the first-named vibrators, and a plurality of switches controllable at will from the player's position at the keyboard for closing the circuits through said branches to produce harmonic partials of the tone produced by the vibrator corresponding to the first-named circuit.

2. In an electrically operated musical instrument having a plurality of tone producing vibrators to vibrate at different periods of vibration corresponding to the notes of a scale, the combination of a keyboard having a plurality of keys corresponding to the different vibrators, an electric circuit corresponding to each key including contacts, closed by the depression of the key, electrical means in each of said circuits for starting the vibration of the corresponding vibrator and thereby producing its tone directly in the atmosphere at the vibrator, branch circuits with electrical means therein for vibrating the vibrators corresponding to the higher notes of the scale and thereby producing higher partial tones directly in the atmosphere corresponding to the fundamental tone from each of the first-named vibrators, a plurality of switches controllable at will from the player's position at the keyboard for closing the circuits through said branches to produce harmonic partials of the fundamental tones produced by the first-named vibrators, and means for controlling the volume of the tones produced by the partial vibrators.

3. In an electrically operated musical instrument, the combination of a plurality of strings mounted to vibrate at different periods of vibration corresponding to the different notes of a scale, a plurality of keys corresponding to the different strings, an electric circuit corresponding to each key including contacts, closed by the depression of the key, electrical means corresponding in each of said circuits for subjecting the string corresponding to its key to a succession of magnetic impulses to start the vibration of the string and thereby sound directly in the atmosphere the fundamental of the note, branch circuits with electrical means therein for subjecting other strings corresponding to higher notes of the scale including partials corresponding to the lower notes of the scale, to magnetic impulses to vibrate the same and thereby produce their tones directly in the atmosphere, and a plurality of switches controlled at will for closing the circuits through said branches.

4. In an electrically operated musical instrument, the combination of a plurality of strings mounted to vibrate at different periods of vibration corresponding to the different notes of a scale, a keyboard having a plurality of keys corresponding to the different strings, an electric circuit corresponding to each key including contacts, closed by the depression of the key, electrical means in each of said circuits for starting and continuing the vibration of the string corresponding to its key to sound the fundamental of the note directly in the atmosphere by the string, branch circuits with electrical means therein for starting and continuing the vibration of other strings corresponding to higher notes of the scale including partials corresponding to the lower notes of the scale, to produce their tones directly in the atmosphere, a plurality of switches controlled at will for closing the circuits through said branches, and means operable at will from the player's position at the keyboard for moving the said electrical means of the branch circuits with relation to the strings to vary the volume of the partial tones with respect to the volume of the fundamental tones.

5. In an electrically operated musical instrument, the combination of a plurality of strings mounted to vibrate at different periods of vibration corresponding to the different notes of a scale, a plurality of keys corresponding to the different strings, an electric circuit corresponding to each key including contacts, closed by the depression of the key, a relay switch corresponding to each key and closed by the depression of the key, a circuit closed through the relay switch including electrical means for starting and maintaining vibration of the string corresponding to the key struck, and thereby producing the tone of the string directly in the atmosphere by the string, a plurality of branch circuits set up by each relay switch, each branch circuit having electrical means therein for vibrating other strings corresponding to higher notes of the scale, including partials corresponding to the lower notes of the scale, and thereby produce partial tones directly in the atmosphere by the strings, and a plurality of switches controlled at will for closing any of the set-up circuits through said branches.

6. In an electrically operated musical instrument, the combination of a plurality of strings mounted to vibrate at different periods of vibration corresponding to the different notes of a scale, a plurality of keys corresponding to the different strings, magnet rails extending across the strings, electromagnets carried by the magnet rail and corresponding to the different strings, an electric circuit corresponding to each key closed by the depression of the key for closing a circuit through the magnet for the string corresponding to the key, and producing a fundamental tone directly in the atmosphere by the vibration of the string, branch circuits passing through the electromagnets for other strings corresponding to the higher notes of the scale for vibrating the same to produce partial tones directly in the atmosphere corresponding to the lower notes of the scale, and a plurality of selective switches controlled at will for closing branch circuits through selected electromagnets corresponding to the higher notes on the scale to produce harmonic partials sounded with the fundamental tone.

7. In an electrical piano, the combination of a plurality of strings mounted to vibrate at different periods of vibration corresponding to the different notes of a scale, a plurality of keys corresponding to the different strings, hammers corresponding to the strings and actuated mechanically by the striking of the keys to vibrate the corresponding string and produce the tone in which the fundamental note of the string predominates, a plurality of branch electric circuits including electromagnets mounted adjacent to the strings corresponding to the higher notes of the scale, with means for closing the said branch circuits by the depression of the key, each branch circuit having an electromagnet therein, and means for passing electric impulses at the frequency of the string through each branch to maintain each string vibration, and sound the string directly in the atmosphere, selective switches for closing the said branch circuits to enable strings corresponding to higher notes of the scale to be sounded simultaneously with the fundamental tone caused by a hammer striking a string, and means for closing the branch circuits by the key struck.

8. In an electrical piano, the combination of a plurality of strings mounted to vibrate at different periods of vibration corresponding to the different notes of a scale, a plurality of keys corresponding to the different strings, hammers corresponding to the strings and actuated mechanically by the striking of the keys to vibrate the corresponding string and produce the tone in which the fundamental note of the string predominates, a plurality of branch electric circuits including electromagnets mounted adjacent to the strings corresponding to the higher notes of the scale, with means for closing the said branch circuits by the depression of the key, selective switches for closing the said branch circuits to enable strings corresponding to higher notes of the scale to be sounded simultaneously with the fundamental tone caused by a hammer striking a string, means for closing the branch circuits by the key struck, and means for controlling the volume of the partial tones produced by the electromagnets.

9. In a piano, the combination of a plurality of strings mounted to vibrate at different periods of vibration corresponding to the different notes of the scale, keys corresponding to the strings, hammers actuated mechanically by the keys for striking the strings, and electrical means controlled by the key for subjecting the strings of the higher notes of the scale to magnetic impulses at a frequency to vibrate the same and sound the same directly in the atmosphere, selectively to play harmonic partials corresponding to the note sounded by the hammer striking the string of a lower note.

10. In a piano, the combination of a plurality of strings mounted to vibrate at different periods of vibration corresponding to the different notes of the scale, keys corresponding to the strings, hammers actuated mechanically by the keys for striking the strings, electrical means controlled by the key for subjecting the strings of the higher notes of the scale to magnetic impulses at a frequency to vibrate the same to sound the same directly in the atmosphere selectively to play harmonic partials corresponding to the note sounded by the hammer striking the string of a lower note, and means controlled at will for inhibiting the actuation of the electrical means.

11. In an electrically operated musical instrument, the combination of a plurality of strings mounted to vibrate at different periods of vibration corresponding to the different notes of a scale, a plurality of keys corresponding to the different strings, a relay switch corresponding to the keys of the lower notes of the scale, means for closing each relay switch by the depression of its corresponding key, a plurality of electromagnets adjacent the strings for subjecting the same to a succession of magnetic impulses, vibrating the strings and thereby sounding the note of the string in the atmosphere, circuits through the said magnets, set up by the relay switches, said magnets including a magnet corresponding to each string for vibrating the string to produce its fundamental tone and including magnets adjacent the strings of the higher notes of the scale for vibrating the same to produce partial tones corresponding to a lower note on the scale when struck, a plurality of selective switches for controlling the circuits passing through the fundamental magnets and through the other magnets for producing the partial tones, and means for controlling the selective switches at will.

12. An attachment for a stringed instrument such as a piano, comprising the combination of a frame extending transversely across the strings of the instrument, with one end of the frame adjacent the bass strings and the other end adjacent the treble strings, electrical means carried on the frame and including electromagnets located adjacent to the strings for vibrating the same, and means controlled at will for moving either end of the frame independently of the other end toward and from the strings to increase the relative volume of treble or bass notes at will.

13. An attachment for a stringed instrument such as a piano, comprising the combination of a frame extending across the strings of the instrument, a row of electromagnets carried on the frame and located adjacent the strings for vibrating the same to produce the fundamental tones of the strings, another row of electromagnets mounted on the frame and located adjacent strings corresponding to the higher notes of the musical scale for sounding partial tones simultaneously with the fundamentals of the lower notes, and means for regulating the distance of the second row of magnets from the strings independently of the first row of magnets.

14. An attachment for a stringed instrument such as piano, comprising the combination of a magnet frame extending across the strings of the instrument, a plurality of "fundamental" magnets carried on the frame and located adjacent the strings of the instrument for playing the fundamental tones of the strings, a plurality of "partial" magnet rails carried on the frame and having "partial" magnets located adjacent the strings of the higher notes of the scale for producing partial tones, and means for regulating the position of the "partial" magnets with respect to the strings independently of the "fundamental" magnets.

15. In an attachment for a stringed instrument in which the strings are mounted in a substantially horizontal plane, the combination of a "fundamental" magnet rail extending across above the strings of the instrument, electromagnets carried by the "fundamental" magnet rail located adjacent the strings for sounding the fundamental tones of the strings, a "partial" magnet rail mounted on the "fundamental" rail, a plurality of "partial" magnets carried by the "partial" rail lying adjacent to the strings corresponding to the higher notes of the scale for sounding harmonic "partials" for the lower notes of the scale, means controlled at will for raising and lowering the "fundamental" rail to control the volume of the fundamental tones, and means controlled at will for independently raising and lowering the "partial" rail to control the relative volume of the "partial" tones produced by the "partial" magnets.

16. An attachment for a stringed instrument such as a piano, comprising the combination of a "fundamental" magnet rail extending across the strings of the instrument, electromagnets carried by the "fundamental" magnet rail located adjacent the strings for sounding the fundamental tones of the strings, a "partial" magnet rail mounted on the "fundamental" rail, a plurality of "partial" magnets carried by the partial rail lying adjacent to the strings corresponding to the higher notes of the scale for sounding harmonic partials for the lower notes of the scale, a second partial rail carried by the fundamental rail, "partial" magnets carried by the second "partial" rail and lying adjacent the strings corresponding to the higher notes of the scale, means controlled at will for moving the "fundamental" rail toward and from the strings to control the volume of the "fundamental" tones produced by the fundamental magnets, and means controlled at will for independently moving the "partial" rails toward and from the strings to control the relative volume of the "partial" tones produced by their magnets.

17. In an electrically operated musical instrument, the combination of a plurality of strings mounted to vibrate at different periods of vibration corresponding to the different notes of a scale, a plurality of keys corresponding to the different strings, a relay switch corresponding to the keys of the lower notes of the scale, means for closing each relay switch by the depression of its corresponding key, a plurality of electromagnets adjacent the strings for subjecting the strings to a succession of magnetic impulses, at a frequency corresponding to the period of vibration of the string, and thereby vibrating the same, circuits through the said magnets, set up by the relay switches, said magnets including a magnet corresponding to each string for vibrating the string to produce its fundamental tone and including magnets adjacent the strings of the higher notes of the scale for producing partial tones corresponding to a lower note on the scale when struck, a plurality of selective switches for controlling the circuits passing through the fundamental magnets and through the magnets for producing the partial tones, means for controlling the selective switches at will, electrically controlled dampers for the strings, and means in the circuits leading through the magnets for closing operating circuits through the dampers to remove the same from the strings.

18. In an electrically operated musical instrument, the combination of a plurality of strings mounted to vibrate at different periods of vibration corresponding to the different notes of a scale, a plurality of keys corresponding to the different strings, a plurality of electromagnets adjacent the strings for vibrating the same, circuits through said magnets, means for closing the said circuits by the keys, dampers corresponding to the strings and having electrical actuating means, and relay switches actuated by the current flowing through the said circuits for closing circuits through the dampers corresponding to the different strings for lifting the same from the strings when the corresponding electromagnet is energized to vibrate the string.

19. In an electrically operated musical instrument, the combination of a plurality of strings mounted to vibrate at different periods of vibration corresponding to the different notes of a scale, a plurality of keys corresponding to the different strings, electrical means for vibrating the strings, electrically actuated dampers associated with the strings, circuits connecting with the electrical string actuating means and with the dampers for lifting the same, and contacts in the circuits, controlled by the keys, and cooperating with the keys to close the circuits for the dampers before closing the circuits for vibrating the strings.

20. In an electrically operated stringed musical instrument, the combination of a set of strings with mechanically operated means for vibrating the same to produce musical tones, a second set of strings to vibrate and produce the same tones as corresponding strings of the first set, electrically actuated means including electromagnets for subjecting the strings to a succession of magnetic impulses to vibrate the strings of the second set, keys corresponding to the strings, hammers actuated by the keys for vibrating the first set of strings, and circuits closed by said keys through the said electrically actuated means for vibrating the strings of the second set.

21. In an electrically operated stringed musical instrument, the combination of a plurality of strings corresponding to different notes of the scale, keys corresponding to the different strings, electromagnets adjacent the different strings for vibrating the same, including "fundamental" magnets for vibrating the strings directly to produce the fundamental tone in the atmosphere and "harmonic" magnets for vibrating strings corresponding to higher notes on the scale to produce the harmonic tones by the vibrating string directly in the atmosphere, electric circuits passing through the said magnets, closed by a single key, and different resistances connected into the circuits of the different magnets so as to control the relative volume of the sound produced by the different strings, thereby enabling a harmonic tone produced by the "harmonic" magnets to have a preponderating volume when a key is struck.

22. In an electrically operated stringed musical instrument, the combination of a plurality of strings corresponding to different notes of the scale, an electromagnet mounted opposite a string corresponding to a relatively low note of the scale, another electromagnet mounted adjacent to a string corresponding to a higher note of the scale, a key corresponding to the first-named electromagnet for closing a circuit through the same, branch circuits closed by the said key and leading through the two magnets in parallel, enabling the two strings adjacent the magnets to be simultaneously vibrated and resistances corresponding to each branch circuit for controlling the relative volume of the tones produced.

23. In an electrically operated stringed musical instrument, the combination of a plurality of strings corresponding to different notes of the scale, keys corresponding to the different strings, electromagnets adjacent the different strings capable of vibrating the same directly by successive magnetic impulses, including "fundamental" magnets for producing fundamental tones, and "harmonic" magnets for vibrating strings corresponding to higher notes on the scale, electrically controlled dampers corresponding to the strings, electric circuits passing through the said electromagnets, a switch for opening the circuits for the electromagnets at will, hammer actions including hammers corresponding to the keys enabling the strings to be vibrated by the hammers when said switch is open, selective switches for setting up circuits through certain of the electrically controlled dampers, and means for closing said last-named circuits by the keys to lift dampers of strings for the higher notes of the scale, thereby producing consonance of harmonic tones corresponding to the string struck by the hammer.

VICTOR H. SEVERY.